US010722804B2

(12) United States Patent
Morris et al.

(10) Patent No.: US 10,722,804 B2
(45) Date of Patent: Jul. 28, 2020

(54) WRAPAROUND PERIPHERAL DEVICE GRIP

(71) Applicant: GAMING GRIPS, INC., Steamboat Springs, CO (US)

(72) Inventors: Michael Lee Morris, Steamboat Springs, CO (US); Michael Jeffrey Kozer, Steamboat Springs, CO (US)

(73) Assignee: GAMING GRIPS, INC., Steamboat Springs, CO (US)

( * ) Notice: Subject to any disclaimer, the term of this patent is extended or adjusted under 35 U.S.C. 154(b) by 59 days.

(21) Appl. No.: 15/998,454

(22) Filed: Aug. 15, 2018

(65) Prior Publication Data

US 2019/0054382 A1 Feb. 21, 2019

Related U.S. Application Data

(60) Provisional application No. 62/545,856, filed on Aug. 15, 2017.

(51) Int. Cl.
*A63F 13/98* (2014.01)
*C09J 7/38* (2018.01)
*B32B 7/12* (2006.01)

(52) U.S. Cl.
CPC .............. *A63F 13/98* (2014.09); *C09J 7/38* (2018.01); *A63F 2300/1043* (2013.01); *B32B 7/12* (2013.01); *C09J 2201/122* (2013.01)

(58) Field of Classification Search
CPC .............. A63F 13/98; A63F 2300/1043; C09J 2201/122
See application file for complete search history.

(56) References Cited

U.S. PATENT DOCUMENTS

| 6,923,443 B1* | 8/2005 | Hughes, IV ............ A63F 13/02 273/148 B |
| D640,697 S | 6/2011 | Lovoi et al. |
| D669,078 S | 10/2012 | Lovoi et al. |
| D708,615 S | 7/2014 | Delrue et al. |
| D712,973 S | 9/2014 | Sumii et al. |

(Continued)

OTHER PUBLICATIONS

U.S. Appl. No. 29/615,415, filed Jun. 29, 2017, Morris et al.

(Continued)

*Primary Examiner* — Vicky A Johnson
(74) *Attorney, Agent, or Firm* — Jason H. Vick; Sheridan Ross, PC

(57) ABSTRACT

A wraparound peripheral device grip comprising a substantially flat continuous sheet is provided. The grip includes a first side and a second side. The first side is configured to adhere to a grip of a peripheral device and the second side is configured to provide improved gripping to a user of the peripheral device. The substantially flat continuous sheet can be cut to fit a geometry of a particular model of peripheral device, or gaming controller. The wraparound peripheral device grip is capable of being placed onto a peripheral device by wrapping the grip around the factory surfaces of a peripheral device. The gripping friction of the grip can be achieved by disposing abrading particles thereon, such as sandpaper, silicon carbide, or grip tape material. Alternatively, the grip side can be made from an elastomer, such as a synthetic rubber, or other material with the property of viscoelasticity.

17 Claims, 12 Drawing Sheets

(56) References Cited

U.S. PATENT DOCUMENTS

| | | | |
|---|---|---|---|
| D730,451 S | 5/2015 | Burgess et al. | |
| D733,802 S | 7/2015 | Burgess et al. | |
| D736,762 S | 8/2015 | Lovoi et al. | |
| D736,860 S | 8/2015 | Lovoi et al. | |
| 9,210,819 B2* | 12/2015 | Cohen | H05K 5/0204 |
| D768,786 S | 10/2016 | Seflic et al. | |
| D780,180 S | 2/2017 | Ironmonger et al. | |
| D787,606 S | 5/2017 | Coe | |
| D816,674 S | 5/2018 | Wu | |
| 2002/0010020 A1* | 1/2002 | Johnson | A63F 13/02 |
| | | | 463/37 |
| 2005/0022924 A1* | 2/2005 | Blackburn | B44C 1/165 |
| | | | 156/230 |
| 2005/0075172 A1* | 4/2005 | Coleman | A63F 13/02 |
| | | | 463/47 |
| 2005/0275165 A1* | 12/2005 | Hussaini | A63F 13/06 |
| | | | 273/148 B |
| 2006/0154029 A1* | 7/2006 | Antonini | B32B 3/00 |
| | | | 428/141 |
| 2006/0198978 A1* | 9/2006 | Antonini | B32B 33/00 |
| | | | 428/41.8 |
| 2009/0162651 A1* | 6/2009 | Rios | A43B 13/04 |
| | | | 428/354 |
| 2014/0125009 A1* | 5/2014 | Sternberg | A63H 33/04 |
| | | | 273/148 B |
| 2018/0154252 A1 | 6/2018 | Mistry | |
| 2019/0054382 A1* | 2/2019 | Morris | A63F 13/98 |

OTHER PUBLICATIONS

U.S. Appl. No. 29/615,446, filed Aug. 29, 2017, Morris et al.
Francisco, Eric "KontrolFreek's FPS Thumbsticks Work, Kind of" Kontrol Freeks FPS; available at https://www.inverse.com/article/9297-kontrolfreek-s-fps-thumbsticks-work-kind-of; posted online Dec. 16, 2015.
Kontrol Freek Controller Performance Grips for PS4 & Xbox One!; available at https://www.youtube.com/watch?v=Jh5galxsRWQ; posted Oct. 7, 2017.
Ex Parte Quayle Action for U.S. Appl. No. 29/615,415, mailed Jun. 28, 2019.
Office Action for U.S. Appl. No. 29/615,446, dated Aug. 26, 2019.
Notice of Allowance for U.S. Appl. No. 29/615,415, dated Oct. 11, 2019.
Office Action for U.S. Appl. No. 29/615,446, dated Mar. 20, 2020.

* cited by examiner

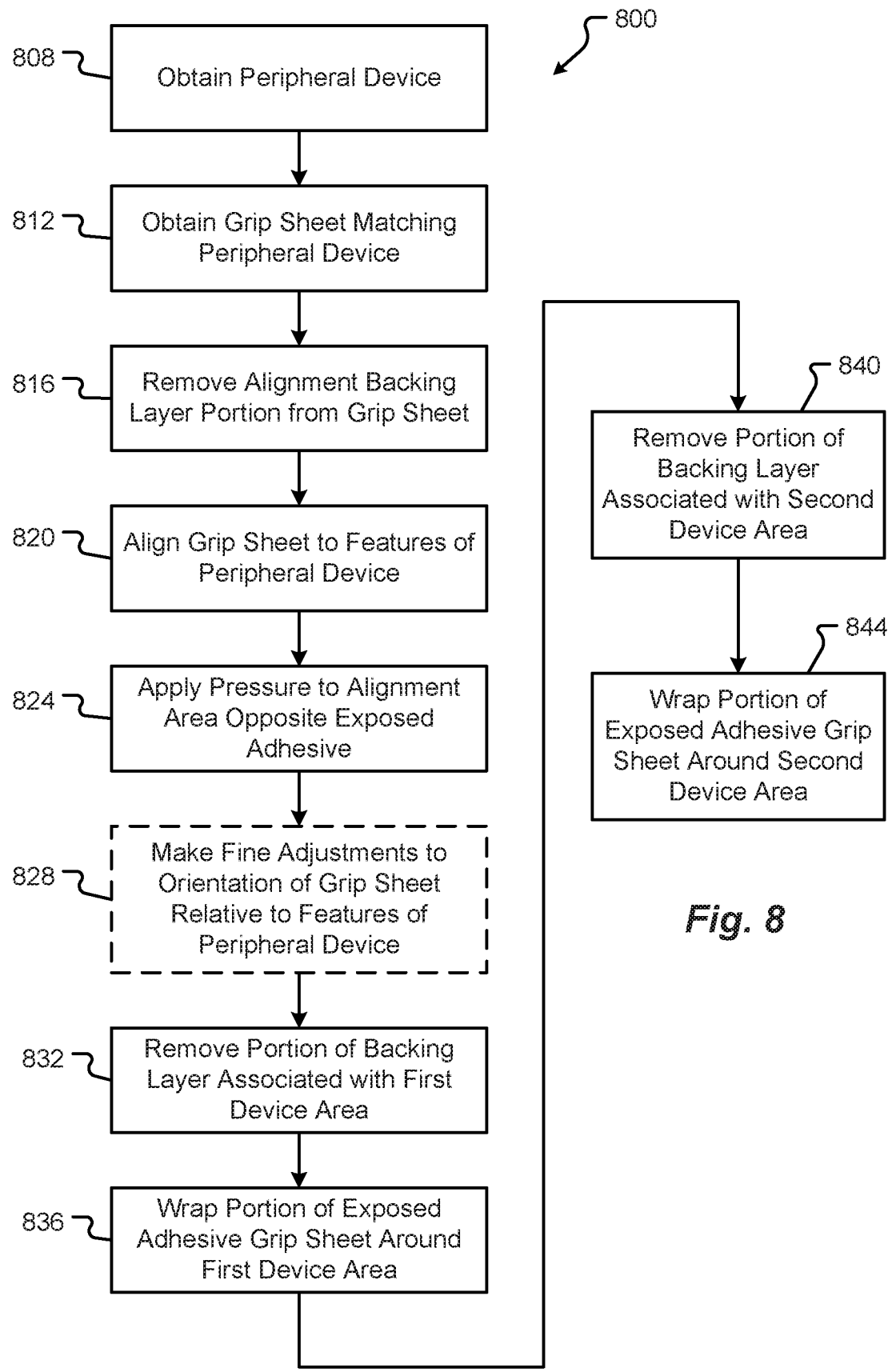

WRAPAROUND PERIPHERAL DEVICE GRIP

CROSS REFERENCE TO RELATED APPLICATION

The present application claims the benefit of and priority, under 35 U.S.C. § 119(e), to U.S. Provisional Application Ser. No. 62/545,856, filed Aug. 15, 2017, entitled "Wraparound Peripheral Device Grip," the entire disclosure of which is hereby incorporated herein by reference, in its entirety, for all that it teaches and for all purposes.

FIELD

The present disclosure relates generally to peripheral device grips, and more specifically, to wraparound grips for human interface control devices and methods of manufacturing the same.

BACKGROUND

Conventionally, most peripheral devices have been made of molded rigid plastic material. Typically, the exterior surface of the gripping area of such peripheral devices include smooth or semi-smooth texturing. Although conventional peripheral devices may be ergonomically designed to fit the hands of most users, many users complain of slippage of the peripheral device or limited grip during use.

In the field of competitive gaming, especially, precise control is a key to success. Most gaming consoles require a handheld controller to provide this precise game input. In many cases, the input may involve quick movements of one or more control sticks, fast actuation of buttons or triggers, and/or combinations thereof. If the controller slips in the hands of a competitive gamer when a precise control input is required, the consequences may be the loss of a game, a match, or a substantial prize.

Accordingly, a need exists for an improved peripheral device grip that allows users to achieve better gripping ability.

SUMMARY

It is with respect to the above issues and other problems that the embodiments presented herein were contemplated. Peripheral device manufacturers have attempted to provide enhanced control by applying a texture, or an overmolded material, to one or more contact surfaces of the buttons, triggers, and/or control sticks. While this approach helps with movement or actuation of the controls it does nothing for the grip on the peripheral device itself. As can be appreciated, during long or challenging gaming sessions the hands of a competitive gamer may begin to sweat or fatigue. At this point, the may lose proper grip of the controller. This lack of grip can result in a missed movement or button actuation and in some cases even in the loss of a game.

Some have attempted to solve this issue by making molded three-dimensional flexible covers that are configured to receive a controller and stretch around various portions making up the grip areas of the controller. In order to stretch over a controller, these covers are often made from compliant materials such as silicone or rubber. A major drawback of these covers lies in the compliance and/or flexibility of the material. Over time, the material continues to stretch and loosen especially when subjected to heat and movement, the very conditions applied to a controller during gaming.

In general, embodiments of the present disclosure provide a wraparound peripheral device grip comprising a substantially flat sheet that, when wrapped around a peripheral device, conforms to the three-dimensional shape of the device. In some embodiments, the wraparound peripheral device grip may include an adhesive layer configured to contact and adhere to an outer surface of the peripheral device. Opposite the adhesive layer is a grip layer comprising at least one textured surface. Depending on the texture, the surface may be configured to provide various levels of grip for a user. In some embodiments, the textured surface may be made from a material including a grit substance that is bonded to a receiving layer. This material may be similar, if not identical, to sandpaper, silicon carbide, and/or other captured grit high-friction material. In one embodiment, the textured surface may be made from a material including a formed plastic incorporating a series of ridges and valleys defining an interrupted surface across an area of the grip.

In some embodiments, the adhesive layer and the grip layer may be separated by an interstitial layer disposed therebetween. The interstitial layer may provide a cushioned or compressible portion between the adhesive layer and the grip layer. In some cases, the interstitial layer may serve as a rigid substrate to receive the adhesive on a first side and the textured surface on an opposite side.

The wraparound peripheral device grip may be manufactured from a substantially flat sheet material including a number of cuts or slits defining a peripheral shape of the grip. When applied to a three-dimensional peripheral device (e.g., a game console controller, etc.), the substantially flat grip may bend and form to match the contour of the peripheral device at the cuts and slits. These cuts and slits allow the flat grip to be wrapped around the peripheral device without overlapping.

In some embodiments, the substantially flat continuous sheet may be flexible. The sheet may have a first side and a second side. The first side may include a material for adhering to a gripping area of a peripheral device and the second side may include a surface for providing improved gripping to a user of the peripheral device. In any event, the substantially flat continuous flexible sheet may be custom cut to fit a particular model of peripheral device. The wraparound peripheral device grip is capable of being placed onto the peripheral device by wrapping the wraparound peripheral device grip around the factory gripping area of the peripheral device. The second, or grip, side of the wraparound peripheral device grip can achieve increased friction by including abrading particles thereon (e.g., using sandpaper, silicon carbide, grit, and/or grip tape). Additionally or alternatively, the grip side can be made from an elastomer, such as a synthetic rubber, or other material with the property of viscoelasticity.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 8 is a flow or process diagram depicting a method for applying a wraparound peripheral device grip to a matching peripheral device in accordance with embodiments of the present disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
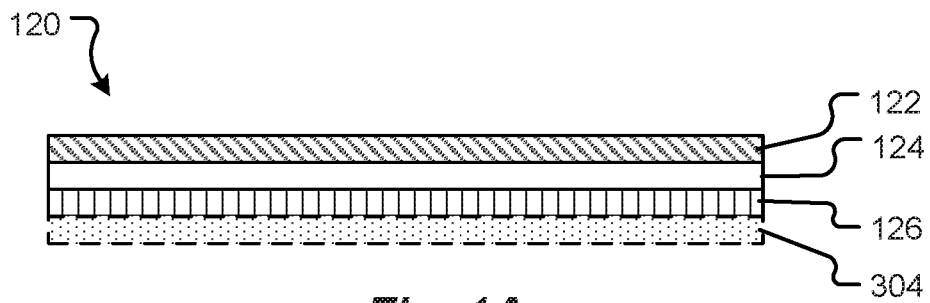
FIG. 1A is a cross-sectional end view of material layers of the wraparound peripheral device grip in accordance with embodiments of the present disclosure.
Figure 1B:
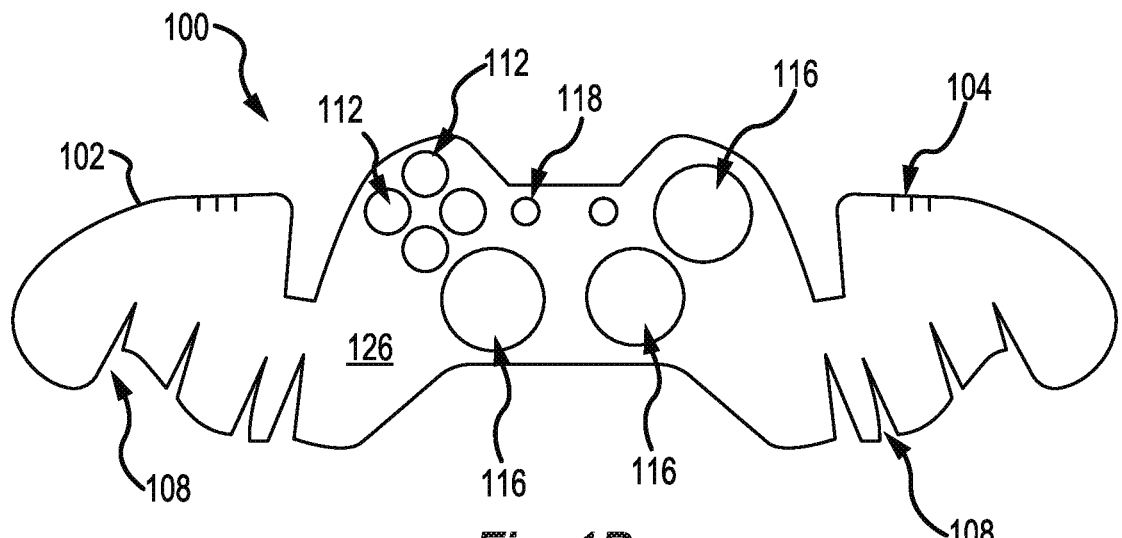
FIG. 1B is a plan view of a wraparound peripheral device grip in accordance with embodiments of the present disclosure.

The structure of the wraparound peripheral device grip 100 will be described in conjunction with FIGS. 1A-1C. Referring to FIG. 1A, a cross-sectional end view of material layers of the wraparound peripheral device grip are shown in accordance with embodiments of the present disclosure. As shown in FIG. 1A, one or more layers of adhesive backed materials may be used to create the wraparound peripheral device grip 100. Although shown as a gaming controller 130 in the figures, it should be appreciated that the wraparound peripheral device grip 100 may be configured to fit any peripheral device 130 and/or controller including a three-dimensional geometry. More specifically, the wraparound peripheral device grip 100 is configured to wrap around various surfaces of a three-dimensional device and provide multiple grip areas for the hands of an engaging user.

In one embodiment, as shown in FIG. 1A, the material 120 of the wraparound peripheral device grip 100 may include a substrate layer 124. The substrate layer 124 may be made from paper or a similar flat, bendable/flexible sheet. An abrasive/gripping material side 122 of the material 120 can include a rough, abrasive surface, and/or a viscoelastic surface. In some embodiments, the abrasive surface of the abrasive/gripping material side 122 achieves abrasion by including abrading particles of silicon carbide, aluminum oxide, garnet, emery, and/or some other abrasive material disposed on a surface of the material 120. Suitable abrasive material includes skateboard grip tape. Other suitable abrasive material includes using medium (80-120 grit) sandpaper and a pressure-sensitive adhesive applied to the smooth side of the sandpaper for the adhesive side 126. In some embodiments, the abrasive/gripping material side 122 may include a viscoelastic surface comprising at least one viscoelastic material. Suitable viscoelastic materials include any material, composite material, etc., made from an elastomer such as synthetic rubber or any other material having viscoelastic properties.

The adhesive side 126 of the wraparound peripheral device grip 100 material 120 may include a pressure-sensitive adhesive capable of selectively and permanently adhering to a peripheral device 130 (e.g., gaming controller, etc.). The phrase "permanently adhering" may mean that removal of the wraparound peripheral device grip 100 from the peripheral device 130 may require substantial or considerable effort and that the grip 100 will not detach from the peripheral device 130 during ordinary usage. In some embodiments, the pressure-sensitive adhesive may provide varying levels of adhesion based on a pressure applied to the material 120. For example, at a first (e.g., low) applied pressure, the pressure-sensitive adhesive may provide a tacky (e.g., low-level) adhesion between the material 120 and a contacting peripheral device that, among other things, allows the material to be removed from, or adjusted relative to, the peripheral device. Continuing this example, a second (e.g., high) applied pressure (e.g., a pressure higher than the first applied pressure and exceeding a predetermined permanent adhesion threshold pressure, etc.), the pressure-sensitive adhesive may provide a permanent (e.g., high-level) adhesion between the material 120 and the contacting peripheral device that, among other things, prevents the material from being removed from, or adjusted relative to, the peripheral device (e.g., without significant deformation or destruction to the material 120).

The wraparound peripheral device grip 100 may include a number of features that are arranged to engage with, or register to, portions of a particular receiving peripheral device 130. As shown in FIGS. 1B and 1C, the wraparound peripheral device grip 100 may include a periphery or outside shape 102 representing a continuous cut in the substantially flat material 120 described above. The grip 100 may include slits 104 and cuts 108 configured to allow the flat sheet to bend and conform to a shape of a receiving device 130 without overlapping or stretching. For example, the slits 104 may be disposed at areas of the peripheral device 130 having surfaces that are raised from at least one adhered adjacent area of the grip 100. The cuts 108 may be disposed at areas of the peripheral device 130 having surfaces that are sloped down, or lower, from at least one adhered adjacent area of the grip 100. In some embodiments, these features may provide an ability for the wraparound peripheral device grip 100 to selectively conform to both concave and convex surfaces of a peripheral device 130. It is an aspect of the present disclosure that the slits 104 and cuts 108 are arranged that, when the grip 100 is adhered to a peripheral device 130, there may be no visible or perceptible seams between adjacent portions of the grip 100 attached. In one embodiment, the seams may be designed to be arranged at areas of the peripheral device 130 that are located apart from the digits of the hand of a user interfacing with the peripheral device 130.

In some embodiments, the wraparound peripheral device grip 100 may include cutouts 112, 116, 118 for receiving buttons, switches, touchpads, control sticks, directional pads, areas, portions, and/or other features of the peripheral device 130 that will be uncovered by the grip 100. As shown in FIGS. 1B and 1C, the first cutouts 112 may be configured to surround at least a portion of one or more action buttons of a controller 130. The second cutouts 116 may be configured to surround at least a portion of a control stick, directional pad, touchscreen, etc., and/or combinations thereof. The third cutouts 118 may be configured to surround at least a portion of selection switches, buttons, or alternative action buttons of the controller 130.

Figure 1C:
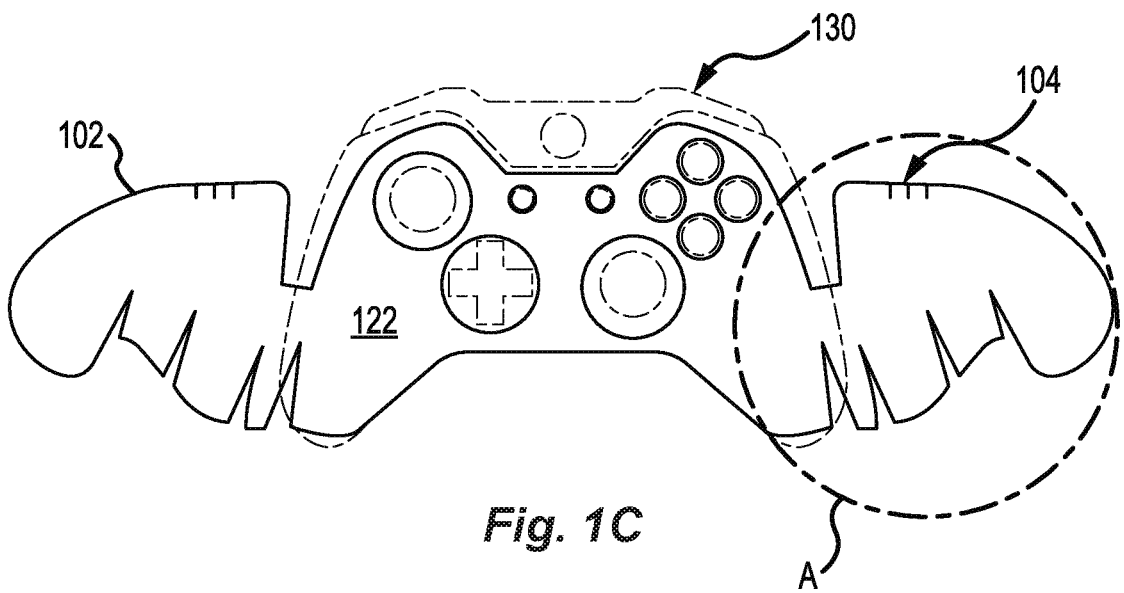
FIG. 1C is a plan view of a wraparound peripheral device grip in a first application state onto a peripheral device in accordance with embodiments of the present disclosure.
Figure 2:
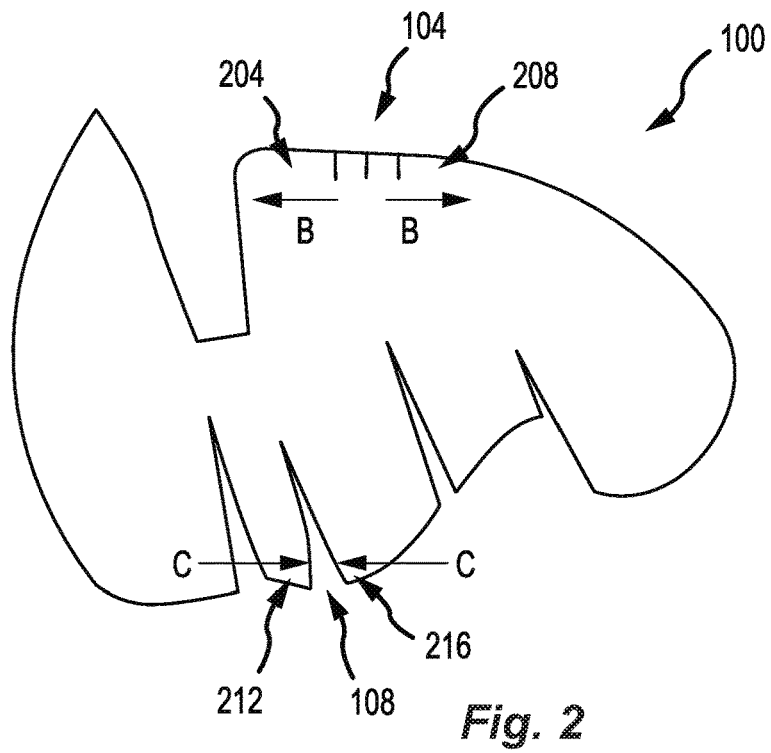
FIG. 2 is a detail view of an area of the wraparound peripheral device grip in accordance with embodiments of the present disclosure.

FIG. 2 shows a detail view of an embodiment of the wraparound peripheral device grip 100 taken from area "A" of FIG. 1C. As shown in FIG. 2, the slits 104 are arranged at a portion of the device 130 such that an adhered first portion 204 of the grip 100 may be separated from a second portion 208 of the grip 100. In some embodiments, the slits 104 may allow a distance between the first and second portions 204, 208 to separate, as shown by directional arrows "B."

In some embodiments, the grip 100 may include a number of cuts 108 to allow the grip 100 to conform to various three-dimensional surfaces of a receiving peripheral device 130. For instance, cuts 108 may be arranged at a portion of the device such that an adhered third portion 212 of the grip 100 may be brought closer to a fourth portion 216 of the grip 100 as the grip 100 is adhered to the three-dimensional downward sloping geometry. In some embodiments, the cuts 108 may be spaced and dimensioned such that a distance between the third and fourth portions 212, 216 may be brought closer together, but not overlapping, as shown by directional arrows "C".

Figure 3A:
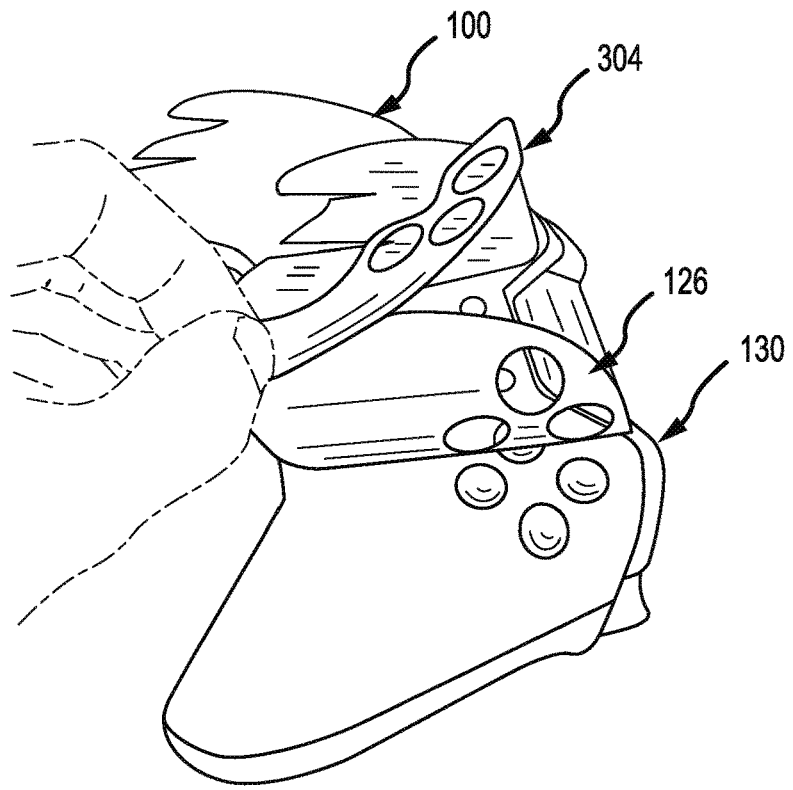
FIG. 3A shows a wraparound peripheral device grip having a backing layer partially removed and being applied to a peripheral device in accordance with embodiments of the present disclosure.

FIG. 3A shows a first step applying the wraparound peripheral device grip 100 to a controller 130. In some embodiments, a portion of a backing layer 304 may first be peeled away, or separated, from the adhesive layer 126 of the material 120 at a center portion of the grip 100 and aligned with the features (e.g., buttons, control sticks, etc.) of the controller 130. The backing layer 304 may be a protective material configured to prevent the grip 100 from accidentally adhering to objects, or itself. The backing layer 304 may provide a smooth, easily removable surface that contacts the adhesive of the adhesive layer, or side, 126 of the material 120 making up the grip 100. In some embodiments, the backing layer 304 may comprise a polyester, laminated, and/or smooth coated surface. As can be appreciated, the backing layer 304 may serve as a release liner for the grip 100. In one embodiment, the backing layer 304 may be coated with silicone or some other non-stick material. This coating allows the material 120 to be separated from the backing layer 304 with very little pull force. Once aligned, the user may apply pressure to the abrasive surface 122 side of the material 100 at an area opposite the exposed adhesive. This first pressure may positively seat the wraparound peripheral device grip 100 to the controller 130.

Figure 3B:
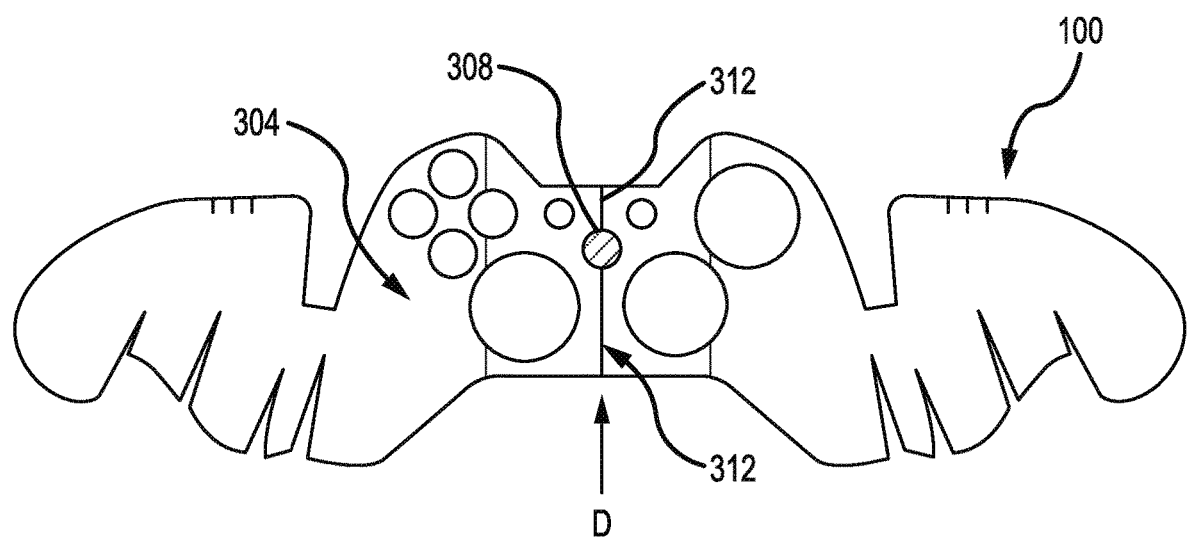
FIG. 3B shows a backing layer of a wraparound peripheral device grip including an exposed portion of adhesive in accordance with embodiments of the present disclosure.

In some embodiments, this portion of the backing layer 304 may allow for rotational alignment and/or controller feature registration with corresponding cutouts in the wraparound peripheral device grip 100. For example, FIG. 3B shows a wraparound peripheral device grip 100 including a backing layer 304 disposed across a majority of the adhesive surface 126. In some cases, a small portion of the backing layer 304 (e.g., an alignment portion cover, etc.) may be removed exposing an alignment portion 308 of the adhesive surface 126. In one embodiment, the backing layer 304 may be separated, or configured to separate, at a scored or cut line 312 in the backing layer 304.

Figure 3C:
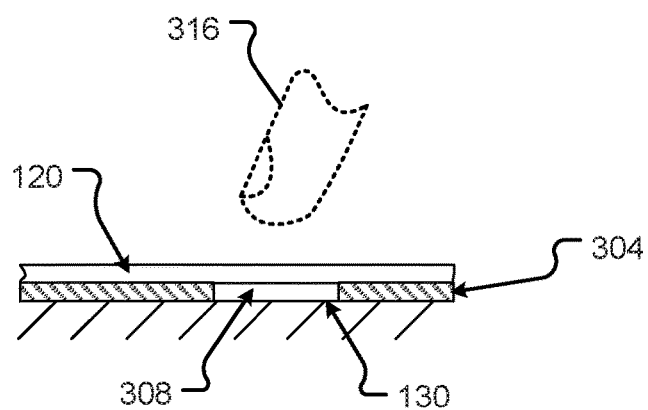
FIG. 3C shows a cross-sectional view of the exposed portion of adhesive disposed above a peripheral device in accordance with embodiments of the present disclosure.
Figure 3D:
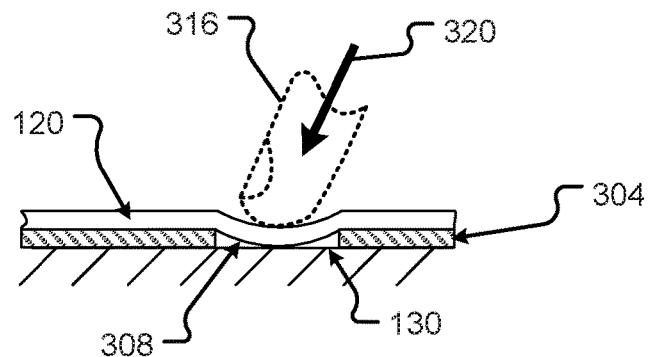
FIG. 3D shows a cross-sectional view of the exposed portion of adhesive contacting a peripheral device in accordance with embodiments of the present disclosure.

FIGS. 3C-3D show partial cross-section views taken from direction "D" through the alignment portion 308 of FIG. 3B at various stages of grip 100 attachment. As shown in FIG. 3C, exposing the alignment portion 308 of the adhesive surface 126 allows a user to position the wraparound peripheral device grip 100 onto a surface of the controller 130 without the grip 100 permanently adhering to the controller 130. For instance, the thickness of the backing layer 304 may separate the alignment portion 308 of the adhesive from contacting the controller surface. Next, and as shown in FIG. 3D, the user may press with a finger 316, or other object, onto the area of the grip 100 opposite the exposed alignment portion 308 of adhesive in a direction 320 toward the controller surface. The material 120 should bend at this area and adhere to the controller 130 only at the defined small area of the alignment portion 308. This small adhered area allows a user to at least rotationally align and/or move the grip 100 prior to removing the entire backing layer 304 permanently adhering the grip 100 in position relative to the controller 130. Additionally or alternatively, the alignment portion 308 may allow the user to adhere the grip 100 to the controller 130 only at this reduced area, and if the alignment is incorrect, simply remove the grip 100 from being adhered at this point and attempt to align the grip 100 again. This removal of the grip 100 is made possible by the limited area of adhesive contact between the adhesive 126 of the grip 100 and the controller 130.

Figure 3E:
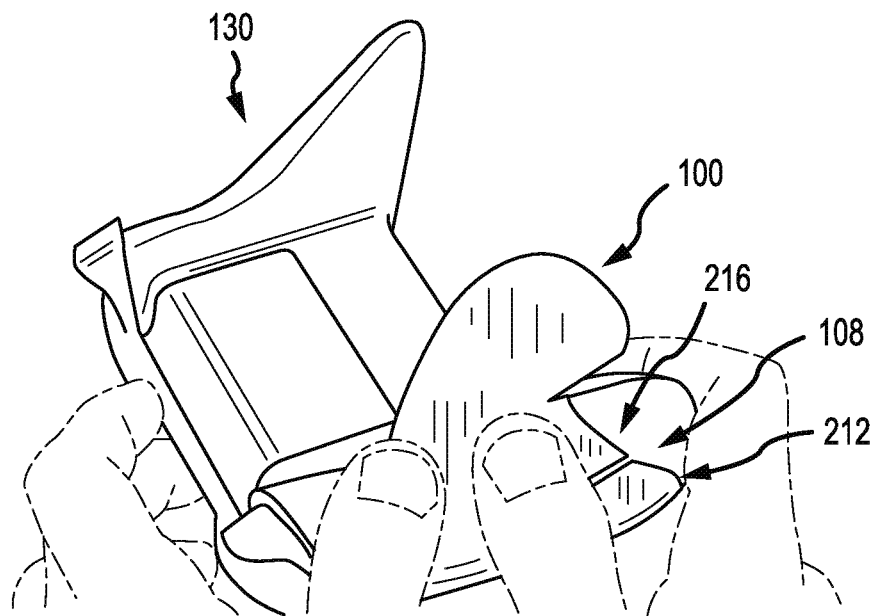
FIG. 3E shows a wraparound peripheral device grip having a backing layer removed and being applied to a peripheral device at a first area in accordance with embodiments of the present disclosure.

FIG. 3E shows a wraparound peripheral device grip 100 having a backing layer 304 removed and being applied to a peripheral device 130 at a first area in accordance with embodiments of the present disclosure. As shown in FIG. 3E, the third portion 212 of the grip 100 is adhered to a first area (e.g., at an arm, handle, or other three-dimensional protuberance) of the controller 130 and the dimension or size of the cut 108 in the flat sheet allows the fourth portion 216 of the grip 100 to be adhered next to the third portion 212 in contact with the controller 130. In some embodiments, the dimension or size of the cut 108 may cause an edge of the third portion 212 to contact or meet at an edge of the fourth portion 216 of the grip 100 without overlapping. This edge contact arrangement of the portions can provide an essentially seamless interface between areas of the grip 100. In one embodiment, the cut 108 may be dimensioned to provide a gap between the portions 212, 216.

Figure 3F:
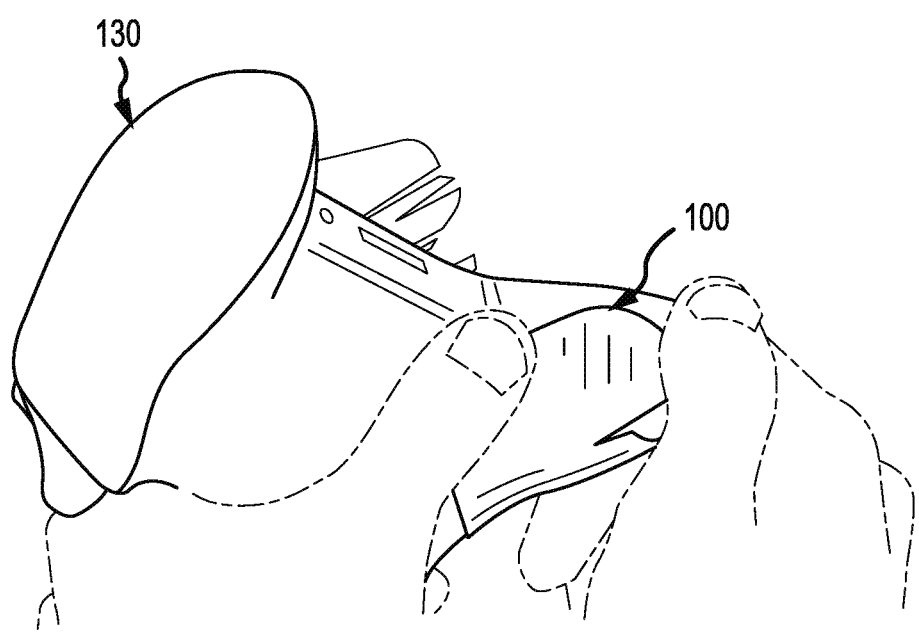
FIG. 3F shows a wraparound peripheral device grip having a backing layer removed and being applied to a peripheral device at a second area in accordance with embodiments of the present disclosure.
Figure 3G:
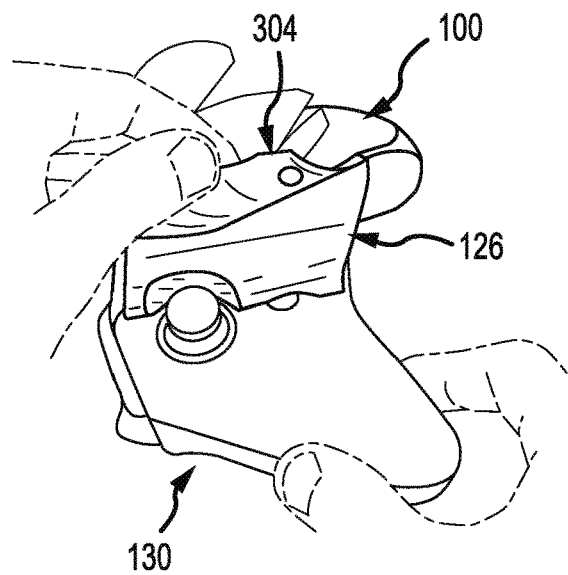
FIG. 3G shows a wraparound peripheral device grip having a backing layer removed and being applied to a peripheral device at a third area in accordance with embodiments of the present disclosure

As shown in FIG. 3F, once the fourth portion 216 is positioned relative to the third portion 212 the remainder of the grip 100 on one side may be wrapped around at least one of the surfaces of the controller 130. In some embodiments, once a first side of the grip 100 is adhered to a first side of the controller 130, a second side may be adhered to the other side of the controller 130. FIG. 3G shows a user removing the backing layer 304 from this second side of the grip 100 and wrapping the remaining unadhered portion of the grip 100 around the controller 130. This wrapping and adhering of the second side of the grip 100 to the controller 130 may be substantially similar, if not identical, to the method of wrapping the first side of the grip 100 described above.

Figure 3H:
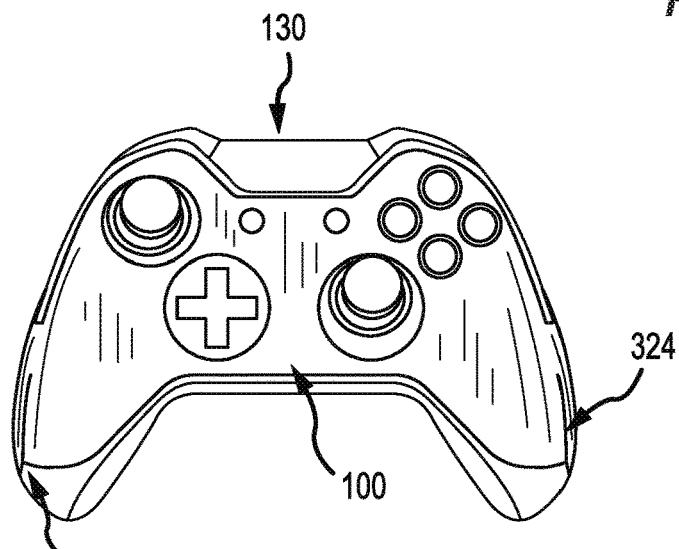
FIG. 3H shows a plan view of a wraparound peripheral device grip applied to a peripheral device in accordance with embodiments of the present disclosure.
Figure 3I:
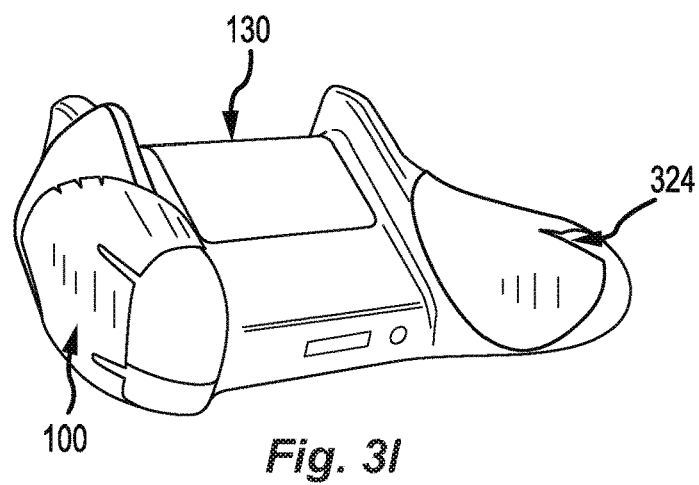
FIG. 3I shows a bottom perspective view of a wraparound peripheral device grip applied to a peripheral device in accordance with embodiments of the present disclosure.

FIGS. 3H and 3I show a wraparound peripheral device grip 100 applied to a peripheral device 130 in accordance with embodiments of the present disclosure. Among other things, the installed wraparound peripheral device grip 100 provides a number of gripping surfaces on multiple sides of the controller 130. Sections of the grip 100 that were separated by cuts 108 may be configured to meet at edges 324 without overlapping. This interface, or edge contact, may provide a substantially seamless appearance of the grip 100 attached to the controller 130. In some embodiments, the edge contact may provide an imperceptible seam, especially to a user interfacing with the grip 100 and controller 130.

Figure 4A:
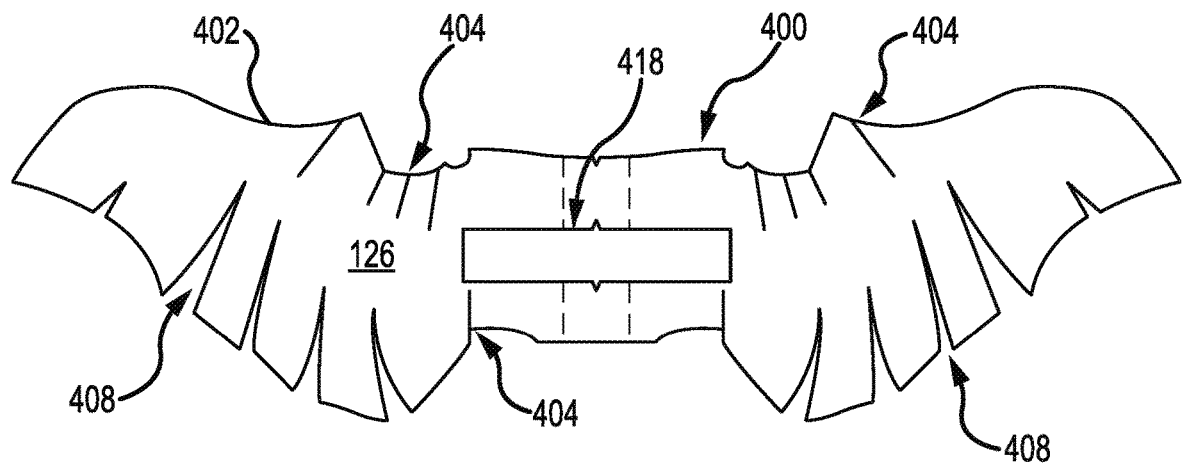
FIG. 4A is a plan view of a wraparound peripheral device grip in a flat state in accordance with embodiments of the present disclosure.

FIG. 4A is a plan view of a wraparound peripheral device grip 400 in a flat state in accordance with embodiments of the present disclosure. The material of the grip shown in FIG. 4A may be similar, if not identical, to the material 120 described in conjunction with FIGS. 1A-1C. Similar to the grip 100 described above, the wraparound peripheral device grip 400 of FIG. 4A may include a number of features that are arranged to engage with, or register to, portions of a particular receiving peripheral device 430 (shown in FIG. 4B). The wraparound peripheral device grip 400 may include a periphery or outside shape 402 representing a continuous cut in the substantially flat material 120 described above. The grip 400 may include a number of slits 404 and cuts 408 configured to allow the flat sheet to bend and conform to a shape of a receiving device 430 without overlapping or stretching. For example, the slits 404 may be disposed at areas of the peripheral device 430 having surfaces that are raised from at least one adhered adjacent area of the grip 400. The cuts 408 may be disposed at areas of the peripheral device 430 having surfaces that are slope down, or lower, from at least one adhered adjacent area of the grip 400. In any event, the outside shape 402, the cuts 404, and the slits 408 may be arranged and/or otherwise disposed to match the contour and shape of a particular controller or peripheral device 430.

In some embodiments, the wraparound peripheral device grip 400 may include cutouts 418 allowing a space to receive a touchscreen, identification label, battery compartment, etc., and/or other area of the peripheral device 430 that will be uncovered by the grip 400.

Figure 4B:
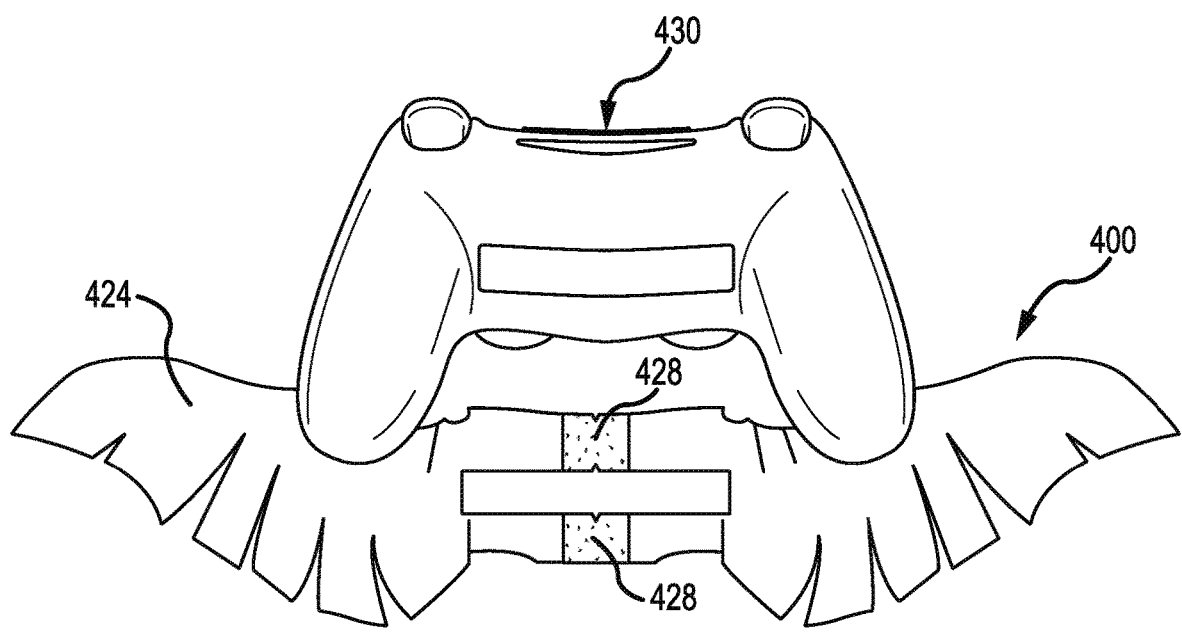
FIG. 4B shows a backing layer of the wraparound peripheral device grip of FIG. 4A including exposed portions of adhesive in accordance with embodiments of the present disclosure.

FIG. 4B shows a backing layer 424 of the wraparound peripheral device grip 400 of FIG. 4A including exposed portions 428 of adhesive in accordance with embodiments of the present disclosure. As shown in FIG. 4B, the backing layer 424 may be disposed across a majority of the adhesive surface 126. The backing layer 424 may be similar, if not identical, to the backing layer 304 described above, and any description of the backing layer 304, and/or other features of the grip 100, above may equally correspond to the backing layer 424 and grip 400 described in conjunction with FIGS. 4A-4H. In some cases, a small portion of the backing layer 424 may be removed exposing one or more alignment portions 428 of the adhesive surface 126. In one embodiment, the backing layer 424 may be separated, or configured to separate, at a scored or cut line on at least one side of the alignment portions 428 in the backing layer 424.

Figure 4C:
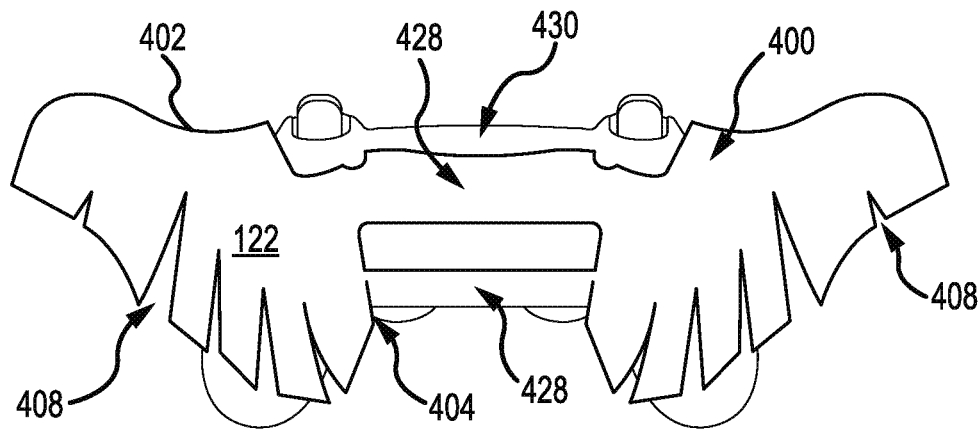
FIG. 4C shows a perspective view of the wraparound peripheral device grip of FIG. 4A contacting a peripheral device at the exposed portions of adhesive in accordance with embodiments of the present disclosure.

As shown in FIG. 4C, the wraparound peripheral device grip 400 may be positioned onto a surface of the controller 430 without the grip 400 permanently adhering to the controller 430. Once positioned, the exposed adhesive surface at the alignment portions 428 may then be pressed against a surface of the controller 430 (similar, if not identical, to the pressing shown and described in conjunction with FIGS. 3C and 3D). In any event, the material 120 should bend at this area and adhere to the controller 430 only at the defined small area of the alignment portion 428. This small adhered area allows a user to at least rotationally align and/or move the grip 400 prior to removing the entire backing layer 424 permanently adhering the grip 400 in position relative to the controller 430. Additionally or alternatively, the alignment portion 428 may allow the user to adhere the grip 400 to the controller 430 only at these one or more reduced areas, and if the alignment is incorrect, simply remove the grip 400 from being adhered at these points and attempt to align the grip 400 again. This removal of the grip 400 is made possible by the limited area of adhesive contact between the adhesive 126 of the grip 400 and the controller 430. Applying the grip 400 may be similar, or identical, to the application described in conjunction with FIGS. 3A-3G.

Figure 4D:
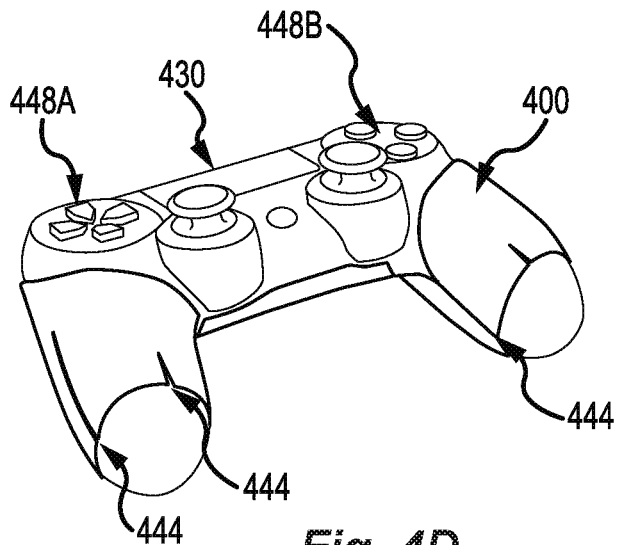
FIG. 4D shows a top perspective view of the wraparound peripheral device grip of FIG. 4A applied to a peripheral device in accordance with embodiments of the present disclosure.
Figure 4E:
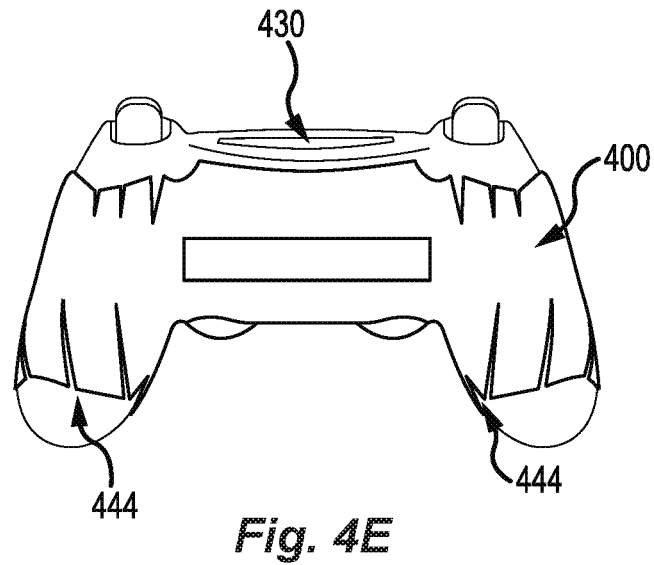
FIG. 4E shows a bottom perspective view of the wraparound peripheral device grip of FIG. 4A applied to a peripheral device in accordance with embodiments of the present disclosure.

FIGS. 4D and 4E show a wraparound peripheral device grip 400 applied to a peripheral device 430 in accordance with embodiments of the present disclosure. Among other things, the installed wraparound peripheral device grip 400 provides a number of gripping surfaces on multiple sides of the controller 430. Sections of the grip 400 that were separated by cuts 408 may be configured to meet at edges 444 without overlapping. This interface, or edge contact, may provide a substantially seamless appearance of the grip 400 attached to the controller 430. In some embodiments, the edge contact may provide an imperceptible seam, especially to a user interfacing with the grip 400 and controller 430. In some cases, the edges 444 may define a gap between the sections of the grip 400 that are parallel or substantially parallel to one another.

Figure 4F:
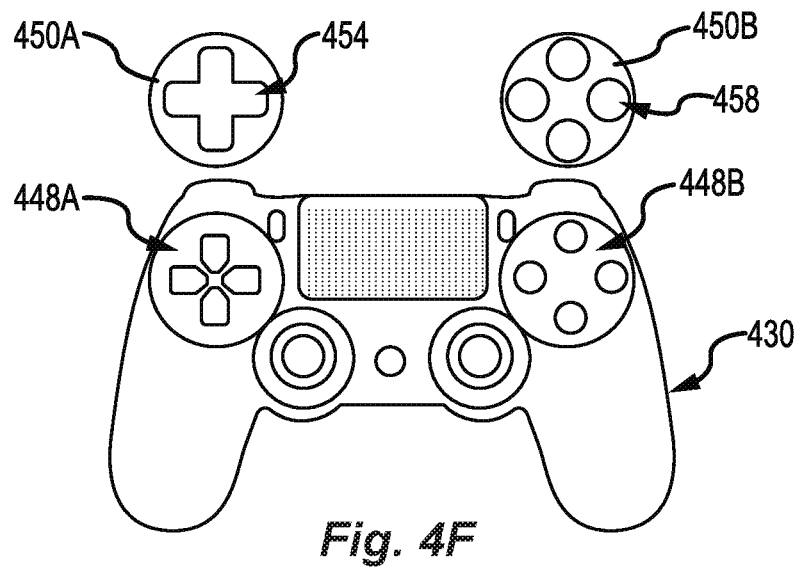
FIG. 4F is a plan view of a peripheral device and control grips in accordance with embodiments of the present disclosure.
Figure 4G:
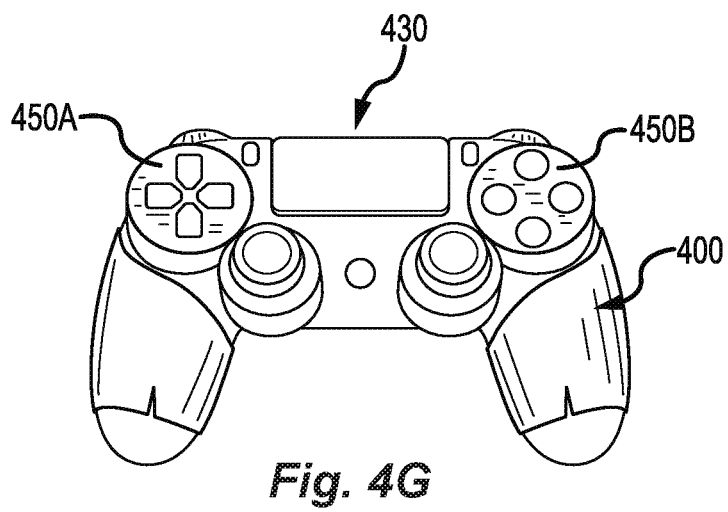
FIG. 4G is a first perspective view of the control grips of FIG. 4F applied to the peripheral device at contact surfaces in accordance with embodiments of the present disclosure.
Figure 4H:
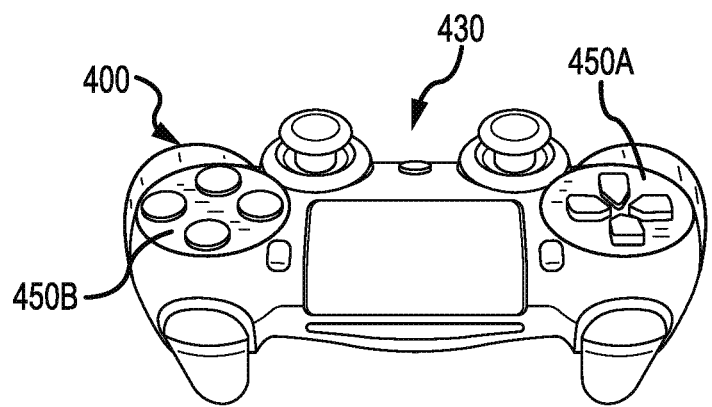
FIG. 4H is a second perspective view of the control grips of FIG. 4F applied to the peripheral device at contact surfaces in accordance with embodiments of the present disclosure.

FIGS. 4F-4H show various views of control grips 450A, 450B that may be applied to the peripheral device 430 in accordance with embodiments of the present disclosure. In some embodiments, the control grips 450A, 450B may be substantially flat. The control grips 450A, 450B may include a textured side including one or more grip surfaces and an adhesive layer disposed on a side opposite the textured side. The control grips 450A, 450B may be similar, if not identical, in material and/or construction to the other grips 100, 400 described in conjunction with FIGS. 1A-4E of the present disclosure. In any event, the control grips 450A, 450B may include an adhesive layer configured to attach to a receiving area or surface 448A, 448B of the peripheral device 430. The receiving surface 448A, 448B may be substantially flat, planar, curved, convex, or concave.

In one embodiment, the control grips 450A, 450B may include one or more removed material portions, apertures, or cutouts 454, 458 such that a void in the control grips 450A, 450B is provided. These cutouts 454, 458, or voids, may be configured to receive one or more buttons, control sticks, switches, or other control elements or features associated with the peripheral device 430. For example, the first control grip 450A may include a cross-shaped cutout 454 configured to encompass or at least partially surround a directional pad when applied to the first receiving surface 448A of the peripheral device 430. As another example, the second control grip 450B may include a number of apertures 458 configured to encompass or at least partially surround a button when applied to the second receiving surface 448B of the peripheral device 430. In some embodiments, the cutouts 454, 458 may provide a void through which one or more control elements or features (e.g., buttons, sticks, switches, pads, raised surfaces, etc.) may pass at least partially through when applied to the peripheral device 430. In one embodiment, the cutouts 454, 458 may be shaped to provide clear, or unobstructed, movement of any actuating elements without contacting the control grips 450A, 450B. For instance, the cutouts 454, 458 may be sized to provide an amount of clearance (e.g., a distance, or dimension) between any portion of the control grips 450A, 450B and the control elements, features, and/or actuating elements of the peripheral device.

In some embodiments, the control grips 450A, 450B may be applied to the peripheral device 430 in addition to, or separately and apart from, a peripheral device grip 430. In one embodiment, the control grips 450A, 450B may provide a user with a tactile surface configured to indicate a contacting portion of the peripheral device 430 by one or more fingers/thumbs. Among other things, this tactile surface can allow a user to quickly determine whether a finger or thumb is placed on a button, directional pad, control stick, etc. or some other surface of the peripheral device 430. In some embodiments, the tactile surface of the control grips 450A, 450B provide a frictional surface upon which a portion of a user's finger/thumb may rest while another portion of the user's finger/thumb may simultaneously contact a control element or feature of the peripheral device 430. In this example, the user can apply a slight pressure to a control element (e.g., without fully actuating the element), allowing for faster response and/or actuation time in use. In one embodiment, the coefficient of friction between the user's finger/thumb and the tactile surface of the control grips 450A, 450B may allow a user to keep their finger/thumb biased against a control element with little effort and/or fatigue.

Figure 5A:
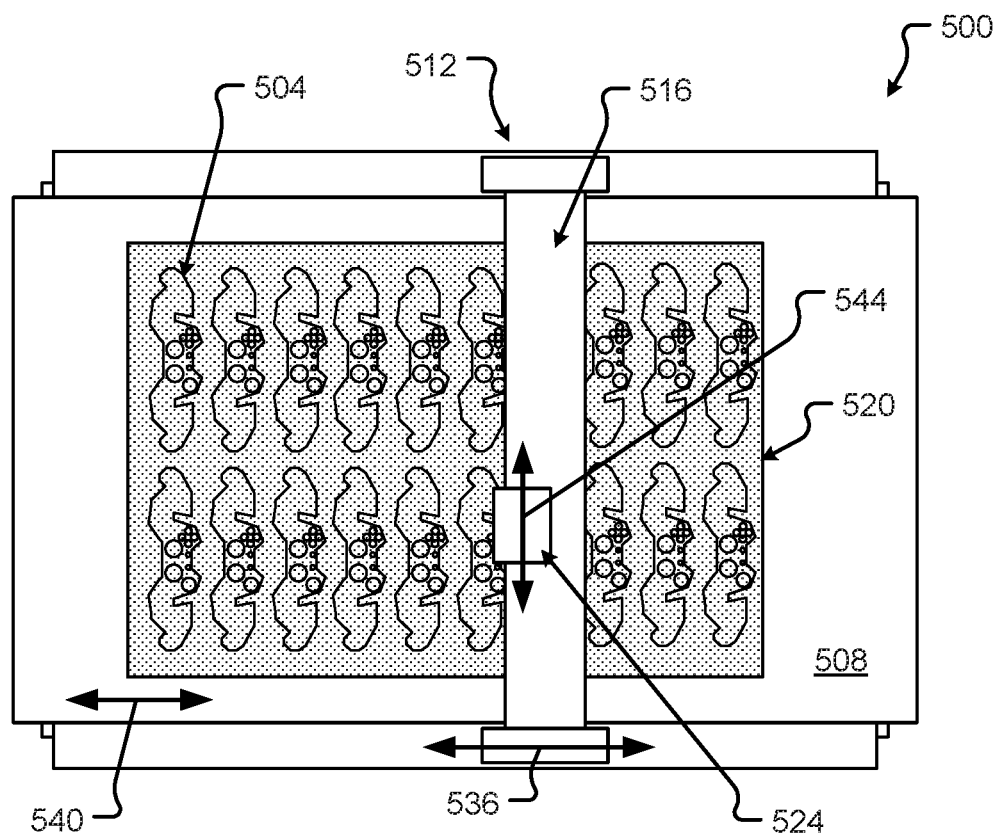
FIG. 5A is a plan view of a system for manufacturing wraparound peripheral device grips from a substantially flat sheet of grip material in accordance with embodiments of the present disclosure.
Figure 5B:
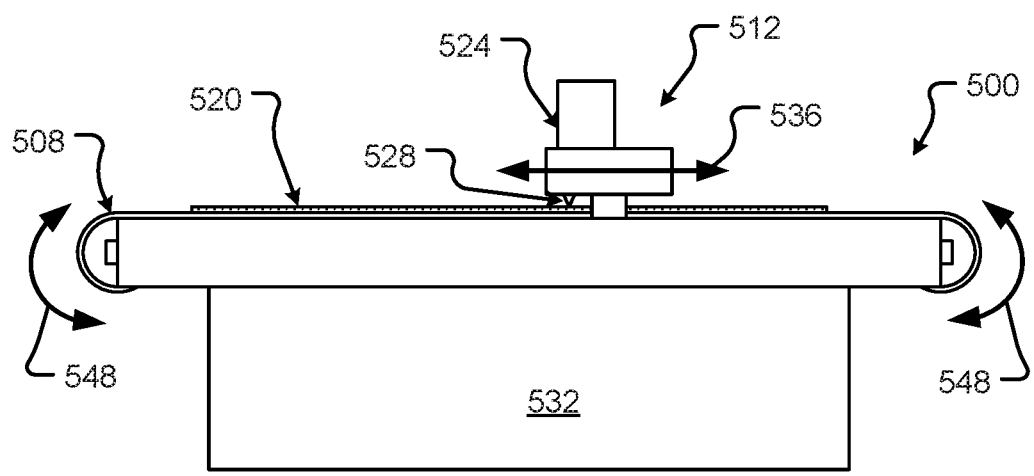
FIG. 5B is an elevation view of the system of FIG. 5A.

FIGS. 5A and 5B show views of a system 500 for manufacturing wraparound peripheral device grips 504 from a substantially flat sheet of grip material 520 in accordance with embodiments of the present disclosure. The system 500 may cut any shape or configuration of grip 100, 400, 450A, 450B described herein or any, two-dimensional geometry, shape, and/or variation thereof. The grip material 520 may be similar, if not identical, to the material 120 described in conjunction with FIGS. 1A-1C. In some embodiments, the material 120, 520 may include a backing layer configured to contact the adhesive layer 126. The backing layer may made from a material allowing easy separation from the adhesive layer 126. The backing layer may be similar, if not identical, to the backing layer 304 described above, and any description of the backing layer 304, and/or other features of the grip 100, above may equally correspond to the backing layer and grips 504 described in conjunction with FIGS. 5A-5B. The material 120, 520 may be unrolled from a roll of material 120, 520 and laid substantially flat onto a work surface 508 or other surface of the system 500.

In some embodiments, the device grips 504 may be cut from the substantially flat material 520 via one or more cutting systems 500. Examples of the system 500 may include, but are in no way limited to, a laser cutting machine, a score cutter, a fixed blade cutting machine, a computer numerical controlled (CNC) machine, etc., and/or other manual, semi-automatic, or automatic cutting machine. In one embodiment, the system 500 may include a computer having a processor, a memory, and at least one application configured to translate two-dimensional shape information into cutting instructions for cutting shapes of the device grips 504 from the substantially flat material 520.

In one embodiment, the system 500 may include a base 532, a work surface 508, and a gantry 512. The gantry 512 may be moveable and/or include one or more moveable components. For instance, the gantry 512 may be configured to move in a first linear direction 536 relative to the base 532 and/or the work surface 508. The gantry 512 may be configured to support a crossbar 516 and a cutting head 524. The cutting head 524 may be configured to translate in a second linear direction 544 that is orthogonal to the first linear direction 536. In some embodiments, the work surface 508 may move in a linear direction 540 relative to the base 532. In one example, the work surface 508 may be configured as a belt that is indexed by rotational movement 548 at one or more rollers. Depending on the shape of the device grips 504, the system 500 may instruct one or more of the gantry 512, the work surface 508, cutting head 524, etc. to move in one or more of the directions 536, 540, 544 providing a single or combination movement.

For example, cutting a circular shape in the grip material 520 may include controlling translation of the cutting head 524 to move in a positive direction of the second linear direction 544, while the gantry 512 is simultaneously controlled to move in a positive direction of the first linear direction 536 for a first 90 degrees of the circle. Next, the cutting head 524 may be controlled to continue moving along the positive direction of the second linear direction 544, while the gantry 512 is simultaneously controlled to move in a negative direction (opposite the positive direction) of the first linear direction 536 for a second 90 degrees of the circle. Continuing this example, the cutting head 524 may be controlled to move in a negative direction (opposite of the positive direction) of the second linear direction 544, while the gantry 512 is simultaneously controlled to continue moving in the negative direction of the first linear direction 536 for a third 90 degrees of the circle. The circular shape may then be closed by the cutting head 524 continuing to move along the negative direction of the second linear direction 544, while the gantry 512 is simultaneously controlled to move in a positive direction (opposite the negative direction) of the first linear direction 536 for the last 90 degrees of the circle.

As can be appreciated, the movement along the first linear direction 536 may be provided by movement of the work surface 508 (in a linear direction 540) rather than movement of the gantry 512 along the first linear direction 536 or in conjunction with a movement of the gantry 512 along the first linear direction 536. In any event, the cutting element 528 (e.g., blade, knife, etc., and/or other sharpened element) may be moved relative to the material 520, and/or the material 520 may be moved relative to the cutting element 528 in cutting the shapes of each device grip 504.

In some embodiments, the work surface 508 may provide a holding force for maintaining a position of the material 520 on the work surface 508 during cutting operations performed by the system 500. In one embodiment, the work surface 508 may be a porous material through which a vacuum can be applied holding the material 520 to the work surface 508. In another embodiment, the work surface 508 may include an adhesive surface, portion, strip, or other surface configured to hold the material 520 in place. It is an aspect of the present disclosure that the material may be indexed out of the system 500 by selectively releasing and/or applying this holding force. In the vacuum example above, the material 520 may be indexed out of the machine by turning off the vacuum and moving the material 520 by indexing the work surface 508. In some cases, the vacuum may be turned off and one or more air jets, fans, or other air blasts may be directed under the material 520. This directed air may provide an air cushion upon which the material 520 may float, or release, from the work surface 508.

Figure 6:
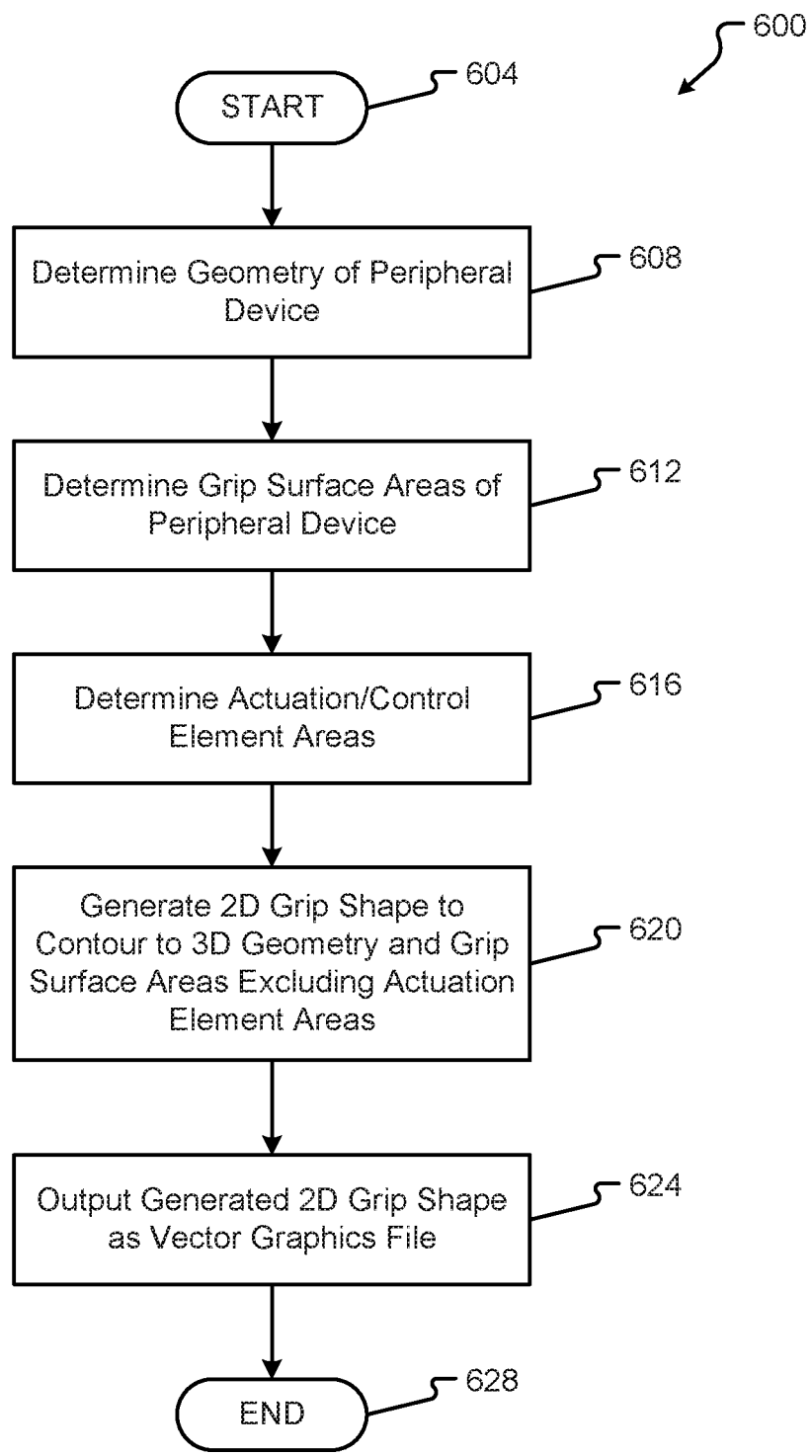
FIG. 6 is a flow or process diagram depicting a method for determining a flat geometry of a grip matching a three-dimensional contour of a peripheral device in accordance with embodiments of the present disclosure.

FIG. 6 is a flow or process diagram depicting a method 600 for determining a flat geometry of a grip matching a three-dimensional contour of a peripheral device in accordance with embodiments of the present disclosure. The method 600 may be performed by a computer, scanning system, and/or other system including three-dimensional to two-dimensional mapping capabilities. The method 600 begins at step 604 and proceeds by determining a geometry of a peripheral device (step 608). Determining the geometry may include placing the peripheral device into a three-dimensional (3D) scanner, laser scanner, etc. One example of a laser scanner may include the Matter and Form model MFS1V1 3D Scanner. In some embodiments, the 3D scanner may be configured to measure a subject part (i.e., peripheral device, etc.), and generate a 3D image of the subject part in the form of a digital file (e.g., STL, OBJ, PLY, XYZ, STEP, IGES, etc.).

Next, the method 600 continues by determining the desired grip surface areas of the peripheral device (step 612). This step may include identifying areas of the peripheral device that is contacted by a user during operation. Typical grip surface areas may include, but are in no way limited to, controller arms, handles, grip surfaces, palm contact surfaces, etc., and/or other three-dimensional protuberances of the peripheral device.

The method 600 proceeds by determining areas of the peripheral device that will not be covered by any grip surface (step 616). In particular, any features, components, or elements of the peripheral device that are configured to receive input may be excluded from grip coverage. These features may include, but are in no way limited to, buttons, triggers, touchpads, control sticks, switches, touchscreens, and/or other control actuation input elements.

Once the grip and non-grip areas are identified, a two-dimensional (2D) shape for the grip may be generated to contour to the 3D geometry of the peripheral device (step 620). Areas excluded from the grip surface may be excluded entirely, or where necessary, cutout of the grip material. The 2D shape may then be exported from the processing system (e.g., computer, processor, etc. running a translation application) as a vector graphics file (e.g., DWG, DXF, AI, EPS, etc.) for a cutting system 500, etc. (step 624). The method 600 ends at step 628.

Figure 7:
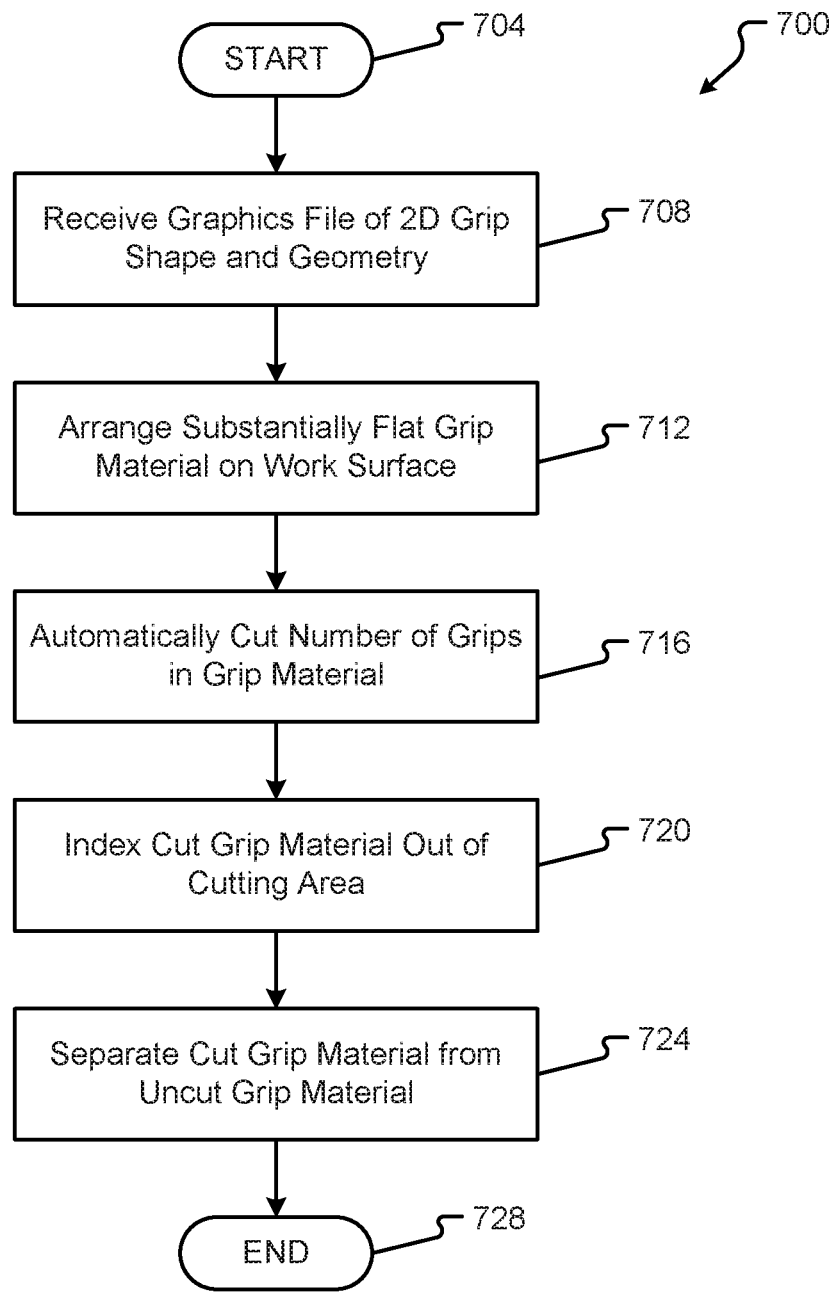
FIG. 7 is a flow or process diagram depicting a method for manufacturing wraparound peripheral device grips in accordance with embodiments of the present disclosure.

FIG. 7 is a flow or process diagram depicting a method 700 for manufacturing wraparound peripheral device grips in accordance with embodiments of the present disclosure. In some embodiments, the method 700 may be performed by the system 500 described in conjunction with FIGS. 5A and 5B. The method 700 begins at step 704 and proceeds by receiving a graphics file (e.g., a vector graphics file, etc.) of the 2D grip shape and/or geometry (step 708). This graphics file may be equivalent to the file generated in steps 620 and 624 and as described in conjunction with FIG. 6.

Next, the method 700 continues by arranging the substantially flat grip material onto the work surface of the cutting system (step 712). In some cases, this arrangement may be performed by the work surface pulling the material from a roll of material disposed adjacent to the work surface. For example, the work surface may apply a vacuum to the material and index in a particular direction while the vacuum is applied pulling the material from a continuous roll of material disposed adjacent to the system.

The method 700 may continue by automatically cutting a number of grips in the grip material (step 716). In one embodiment, this step is performed by the cutting system translating the 2D shape information into a series of cutting steps and movements (e.g., made by actuating a cutting head of the system). Once the grips are cut (or scored) in the material, the material may be indexed out of the cutting area of the cutting system (step 720). This indexing may be similar, if not identical, to the indexing described in conjunction with FIGS. 5A and 5B above.

In the event that the material is part of a long piece of substantially flat material, or a roll of material, the method 700 may continue by separating the material including the cut grips from a portion of the material not including cut grips (step 724). The material may be separated by moving a member along a scored line between the portions of the material, providing a separation force. In one embodiment, the material may be separated via one or more air blasts directed to the score line or some other area of the material. In yet another embodiment, the cut material may be held by a gripper and forcibly removed from the uncut material (e.g., the portion of material including no cut grip shapes therein). The method 700 ends at step 728.

FIG. 8 is a flow or process diagram depicting a method 800 for applying a wraparound peripheral device grip to a matching peripheral device in accordance with embodiments of the present disclosure. The steps shown in FIG. 8 may be similar, or identical, to the steps of applying the grip material described in conjunction with FIGS. 3A-4E.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others. For instance, various materials and/or cutting processes may be used.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Summary for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Summary, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a wraparound peripheral device grip, comprising: a substantially flat continuous flexible sheet having a first side and a second side, the first side for adhering to a gripping area of a peripheral device and the second side for providing improved gripping to a user of the peripheral device, the substantially flat continuous flexible sheet cut to fit a model of the peripheral device.

Aspects of the above wraparound peripheral device grip include wherein the substantially flat continuous flexible sheet defines an area of material including a peripheral cut shape completely surrounding the area of material. Aspects of the above wraparound peripheral device grip include wherein the substantially flat continuous flexible sheet includes a first portion configured to bend out of a plane defining the substantially flat continuous flexible sheet and wrap around a majority of a curved three-dimensional protuberance of the peripheral device. Aspects of the above wraparound peripheral device grip further comprising: a backing layer attached to the first side of the substantially flat continuous flexible sheet, wherein the backing layer includes a score line passing through a majority of a thickness of the backing layer and dividing the backing layer into a first separable portion and a second separable portion. Aspects of the above wraparound peripheral device grip include wherein the backing layer includes an alignment portion cover defined by a scored area of the backing layer, wherein the alignment portion cover is removable from the backing layer to reveal an area of adhesive on the first side of the substantially flat continuous flexible sheet. Aspects of the above wraparound peripheral device grip include wherein the first side is completely covered with a pressure-sensitive adhesive material. Aspects of the above wraparound peripheral device grip include wherein the second side is completely covered with an abrasive material. Aspects of the above wraparound peripheral device grip further comprising: a plurality of apertures disposed inside the area of material and passing completely through the first side and the second side of the substantially flat continuous flexible sheet.

Embodiments include a wraparound gaming controller grip, comprising: a substantially flat continuous flexible sheet comprising: a grip surface layer having one or more gripping features disposed thereon; an adhesive surface layer disposed opposite the grip surface layer; and a backing layer in contact with the adhesive surface layer and opposite the grip surface layer; and a plurality of cuts disposed around a periphery of the wraparound gaming controller grip, wherein each cut separates adjacent portions of the substantially flat continuous flexible sheet a first distance in a flat state and a closer second distance in a contoured state.

Aspects of the above wraparound gaming controller grip include wherein the adjacent portions of the substantially flat continuous flexible sheet separated by a first cut of the plurality of cuts meet along edges of the first cut in the contoured state. Aspects of the above wraparound gaming controller grip include wherein the substantially flat continuous flexible sheet is in the contoured state when adhered to a gaming controller via the adhesive surface layer contacting a curved portion of the gaming controller. Aspects of the above wraparound gaming controller grip include wherein the backing layer is separable from the substantially flat continuous flexible sheet. Aspects of the above wraparound gaming controller grip include wherein the backing layer includes a score line passing through a majority of a thickness of the backing layer and dividing the backing layer into a first separable portion and a second separable portion. Aspects of the above wraparound gaming controller grip include wherein the backing layer includes an alignment portion cover defined by a scored area of the backing layer, wherein the alignment portion cover is removable from the backing layer and the adhesive surface layer to reveal an area of adhesive associated with the adhesive surface layer. Aspects of the above wraparound gaming controller grip include wherein the grip surface layer is completely covered with an abrasive material, and wherein the adhesive surface layer is completely covered with a pressure-sensitive adhesive material. Aspects of the above wraparound gaming controller grip further comprising: a plurality of control element apertures disposed inside the area of material and passing completely through the first side and the second side of the substantially flat continuous flexible sheet.

Embodiments include a method of applying a wraparound peripheral device grip to a peripheral device, comprising: removing a first backing layer portion completely from a backing layer of the wraparound peripheral device grip, wherein the backing layer substantially covers an area of an adhesive layer of the wraparound peripheral device grip, and wherein removal of the first backing layer portion exposes an adhesive portion located near a center of the wraparound peripheral device grip; placing the backing layer of the wraparound peripheral device grip onto a surface of the peripheral device, wherein the exposed adhesive portion is offset from the surface of the peripheral device by a thickness of the backing layer such that the wraparound peripheral device grip does not adhere to the peripheral device; aligning the wraparound peripheral device grip to one or more features of the peripheral device; and applying, in response to aligning the wraparound peripheral device grip to the peripheral device, a contact pressure to a side of the wraparound peripheral device grip opposite the exposed adhesive portion moving the exposed adhesive portion into contact with the surface of the peripheral device such that the wraparound peripheral device grip is adhered to the peripheral device at the adhesive portion.

Aspects of the above method further comprising: removing an entirety of a first half of the backing layer exposing half of the adhesive layer of a first side of the wraparound peripheral device grip; and wrapping the first side of the wraparound peripheral device grip around a first contoured portion of the peripheral device. Aspects of the above method further comprising: removing an entirety of a second half of the backing layer exposing a remaining half of the adhesive layer of a second side of the wraparound peripheral device grip; and wrapping the second side of the wraparound peripheral device grip around a second contoured portion of the peripheral device Embodiments include a method of manufacturing a wraparound peripheral device grip, comprising: cutting, via a cutting system, through multiple layers of a substantially flat continuous flexible sheet, wherein the sheet includes a plurality of layers including a grip surface layer disposed above an adhesive surface layer disposed above a backing layer along a two-dimensional outline of a peripheral device grip; wherein the two-dimensional outline of a peripheral device grip is configured to fit a model of the peripheral device when bent from a flat state into a contoured state.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

What is claimed is:

1. A wraparound peripheral device grip, comprising:
a substantially flat continuous flexible sheet having a first side and a second side, the first side adapted to adhere to a gripping area of a peripheral device and the second side to provide improved gripping to a user of the peripheral device, the substantially flat continuous flexible sheet cut to fit a model of the peripheral device, wherein:
the substantially flat continuous flexible sheet defines an area of material including a peripheral cut shape completely surrounding the area of material,
the substantially flat continuous flexible sheet includes a first portion configured to bend out of a plane defining the substantially flat continuous flexible sheet and wrap around a majority of a curved three-dimensional protuberance of the peripheral device, and
the peripheral cut shape includes a plurality of cuts extending into the area of material at least at the first portion, and wherein the plurality of cuts provide a flexible relief for the first portion to contour to the curved three-dimensional protuberance of the peripheral device.

2. The wraparound peripheral device grip of claim 1, further comprising:
a backing layer attached to the first side of the substantially flat continuous flexible sheet, wherein the backing layer includes a score line passing through a majority of a thickness of the backing layer and dividing the backing layer into a first separable portion and a second separable portion.

3. The wraparound peripheral device grip of claim 2, wherein the backing layer includes an alignment portion cover defined by a scored area of the backing layer, wherein the alignment portion cover is removable from the backing layer to reveal an area of adhesive on the first side of the substantially flat continuous flexible sheet.

4. The wraparound peripheral device grip of claim 3, wherein the first side is completely covered with a pressure-sensitive adhesive material.

5. The wraparound peripheral device grip of claim 4, wherein the second side is completely covered with an abrasive material.

6. The wraparound peripheral device grip of claim 5, further comprising:
a plurality of apertures disposed inside the area of material and passing completely through the first side and the second side of the substantially flat continuous flexible sheet.

7. A wraparound gaming controller grip, comprising:
a substantially flat continuous flexible sheet comprising:
a grip surface layer having one or more gripping features disposed thereon;
an adhesive surface layer disposed opposite the grip surface layer; and
a backing layer in contact with the adhesive surface layer and opposite the grip surface layer; and
a plurality of cuts disposed around a periphery of the wraparound gaming controller grip, wherein each cut separates adjacent portions of the substantially flat continuous flexible sheet a first distance in a flat state and a closer second distance in a contoured state.

8. The wraparound gaming controller grip of claim 7, wherein the adjacent portions of the substantially flat continuous flexible sheet separated by a first cut of the plurality of cuts meet along edges of the first cut in the contoured state.

9. The wraparound gaming controller grip of claim 8, wherein the substantially flat continuous flexible sheet is in the contoured state when adhered to a gaming controller via the adhesive surface layer contacting a curved portion of the gaming controller.

10. The wraparound gaming controller grip of claim 7, wherein the backing layer is separable from the substantially flat continuous flexible sheet.

11. The wraparound gaming controller grip of claim 10, wherein the backing layer includes a score line passing through a majority of a thickness of the backing layer and dividing the backing layer into a first separable portion and a second separable portion.

12. The wraparound gaming controller grip of claim 11, wherein the backing layer includes an alignment portion cover defined by a scored area of the backing layer, wherein the alignment portion cover is removable from the backing layer and the adhesive surface layer to reveal an area of adhesive associated with the adhesive surface layer.

13. The wraparound gaming controller grip of claim 11, wherein the grip surface layer is completely covered with an abrasive material, and wherein the adhesive surface layer is completely covered with a pressure-sensitive adhesive material.

14. The wraparound gaming controller grip of claim 13, further comprising:
a plurality of control element apertures disposed inside the area of material and passing completely through the first side and the second side of the substantially flat continuous flexible sheet.

15. A method of applying a wraparound peripheral device grip to a peripheral device, comprising:
removing a first backing layer portion completely from a backing layer of the wraparound peripheral device grip, wherein the backing layer substantially covers an area of an adhesive layer of the wraparound peripheral device grip, and wherein removal of the first backing layer portion exposes an adhesive portion located near a center of the wraparound peripheral device grip;
placing the backing layer of the wraparound peripheral device grip onto a surface of the peripheral device, wherein the exposed adhesive portion is offset from the surface of the peripheral device by a thickness of the backing layer such that the wraparound peripheral device grip does not adhere to the peripheral device;
aligning the wraparound peripheral device grip to one or more features of the peripheral device; and
applying, in response to aligning the wraparound peripheral device grip to the peripheral device, a contact pressure to a side of the wraparound peripheral device grip opposite the exposed adhesive portion moving the exposed adhesive portion into contact with the surface of the peripheral device such that the wraparound peripheral device grip is adhered to the peripheral device at the adhesive portion.

16. The method of claim 15, further comprising:
removing an entirety of a first half of the backing layer exposing half of the adhesive layer of a first side of the wraparound peripheral device grip; and
wrapping the first side of the wraparound peripheral device grip around a first contoured portion of the peripheral device.

17. The method of claim 16, further comprising:
removing an entirety of a second half of the backing layer exposing a remaining half of the adhesive layer of a second side of the wraparound peripheral device grip; and
wrapping the second side of the wraparound peripheral device grip around a second contoured portion of the peripheral device.

\* \* \* \* \*